United States Patent
Khazaka et al.

(10) Patent No.: US 7,627,354 B2
(45) Date of Patent: Dec. 1, 2009

(54) DISPLAY FORMAT FOR HANDHELD WIRELESS COMMUNICATION DEVICES

(75) Inventors: Samir Khalil Khazaka, San Diego, CA (US); Bradley C. Kirn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 10/232,565

(22) Filed: Aug. 30, 2002

(65) Prior Publication Data
US 2004/0204130 A1 Oct. 14, 2004

(51) Int. Cl.
*H04M 1/00* (2006.01)
(52) U.S. Cl. ............... 455/575.1; 455/557; 382/296; 382/297; 382/298; 344/649; 344/619; 344/625; 709/223; 709/217; 709/245
(58) Field of Classification Search ............. 455/566, 455/556.2, 575.1; 345/649, 656, 659, 657, 345/658; 709/217, 245, 223; 382/296, 297, 382/298; 344/649, 619, 658, 583, 625; 358/342, 358/311, 335, 403
See application file for complete search history.

(56) References Cited

U.S. PATENT DOCUMENTS

| | | |
|---|---|---|
| 5,434,964 A | 7/1995 | Moss et al. |
| 5,448,372 A * | 9/1995 | Axman et al. ............ 386/124 |
| 5,592,572 A * | 1/1997 | Le .......................... 382/289 |
| 5,661,632 A | 8/1997 | Register |
| 6,262,796 B1 | 7/2001 | Loopstra et al. |
| 6,297,795 B1 * | 10/2001 | Kato et al. ................ 345/684 |
| 6,311,180 B1 * | 10/2001 | Fogarty ...................... 707/4 |
| 6,486,890 B1 * | 11/2002 | Harada et al. ............. 345/660 |
| 6,597,384 B1 * | 7/2003 | Harrison .................. 345/204 |

FOREIGN PATENT DOCUMENTS

| | | |
|---|---|---|
| JP | 08 129557 A | 5/1996 |
| WO | 200042911 | 7/2000 |

OTHER PUBLICATIONS

Pedro Gomes et al., "Web-Clipping: Compression Heuristics for Displaying Text on a PDA," Instituto Superior Tecnico, Lisboa, pp. 1-6.

Chris Tull, "Self-Contained PDA Applications: Part I Creating Your Own e-Pet," internet article at http://www.devx.com/wireless/articles/PDA/PDAct112100.asp, 10 pages.

International Search Report PCT/US2003/026900, International Search Authority-EPO, Dec. 30, 2003.

* cited by examiner

*Primary Examiner*—Charles N Appiah
*Assistant Examiner*—Randy Peaches
(74) *Attorney, Agent, or Firm*—Donald C. Kordich; Nicholas A. Cole

(57) ABSTRACT

A method and apparatus displays a web page on a wireless communication device. The web page is received (203) and a determination is made as to whether the received web page is formatted for a first orientation on a display screen of the wireless communication device (204). When the received web page is not formatted for the first orientation on the display screen, the received web page is automatically displayed in a second orientation on the display screen. (206, 208).

36 Claims, 2 Drawing Sheets

DISPLAY FORMAT FOR HANDHELD WIRELESS COMMUNICATION DEVICES

BACKGROUND

1. Field

The present invention relates generally to wireless communications, and more specifically to display format for handheld wireless communication devices.

2. Background

Handheld wireless communication devices, for example, a wireless personal digital assistant (PDA), a wireless handheld computer, and a wireless web-enabled cellphone, have a small elongated rectangular display screen mounted on the front wall of the housing of the device. The viewing orientation on the display screen is typically in a vertically elongated orientation, also called a "portrait" orientation. In the portrait orientation, the image on the display screen is greater in dimension in the vertical direction than it is in the horizontal direction. Some applications, however, are visually handicapped by the narrow display width of the portrait-oriented display screen.

Handheld wireless communication devices can access web sites designed for displaying web pages on monitors of desktop computers or laptop computers. These websites are referred to as standard web sites, and their web pages are referred to as standard web pages. Handheld wireless communication devices also can access web sites designed for displaying web pages on a display screen of a handheld wireless communication device. These websites are referred to as a wireless portal, and their web pages are referred to as wireless web pages. The web pages are typically designed with more text and little graphic to facilitate a quick download over slow wireless links. As the speed of wireless links improve, for example, with certain versions of cdma2000 and third-generation systems, the content of wireless web pages will increase. Nevertheless, the wireless web pages will be designed for display on the display screen.

Some web sites contain web pages that are dynamically generated for both monitors of desktop or laptop computers and display screens of wireless communication devices. Typically, the web site determines if the wireless communication device's browser is designed for displaying images on a display screen of a wireless communication device, and then sends a downsized version of the web page (the wireless web page), rather than the full content of a standard web page, when the web site determines that the browser is designed for a wireless communication device.

There are numerous conventional Web browsers for handheld wireless communication devices that are portrait oriented, for example, AvantGo™ brand browser by AvantGo, Web Whacker™ brand browser by Blue Squirrel, Pocket Browser™ brand browser by Conduits Technologies, Pocket IE™ brand browser by Microsoft, EudoraWeb™ brand browser by Qualcomm, and Whack Force™ brand browser by Ruksun Software Technologies.

When a wireless portal is accessed, it would be better to display the wireless web page on the portrait-oriented display screen because the wireless web page is formatted for the size of the display screen. When a standard web page is viewed on a portrait-oriented display screen, however, only a corner of the wireless web page is shown. This is due to the difference in size between the screen display of the handheld device and the monitor of the desktop computer. The viewed corner is in a portrait orientation rather than the landscape orientation typical of monitors of desktop computers or laptop computers. The user might find it inconvenient to browse the standard web page because of the scrolling, especially in the horizontal direction, to view the entire standard web page.

Presenting the standard web page on a landscape-orientated display screen would be more convenient because the landscape orientation allows the device to fit more of the standard web page in the horizontal direction. In a "landscape" orientation, the viewing orientation of the image on the display screen is in a horizontally elongated orientation, and the image on the display screen is greater in dimension in the horizontal direction than it is in the vertical direction. In the landscape orientation, the image aspect ratio and the display screen orientation are better matched than in the portrait orientation. Because standard web pages are designed to be scrolled vertically, the landscape display of standard web pages helps in preserving the context of the standard web page and reducing scrolling in the horizontal direction.

Landscape-oriented browsers are known, for example, ThunderHawk™ browser by Bitstream, which approximate the experience of a desktop browser by providing a landscape orientation for the display of images. In addition, the standard web page is reformatted to fit partially within the display screen in the landscape orientation. Some of this formatting is performed on a proxy server and may include resizing the font of text and reducing the size of images before transmitting the reformatted web page to the wireless communication device.

SUMMARY

A need exists for a method and device that can automatically detect whether the wireless communication device has accessed a standard web page or a wireless web page in order to display the accessed web page in the appropriate orientation without intervention by the user. For example, for an accessed wireless web page, the device would display the wireless web page in a portrait orientation or launch a portrait-oriented browser. Correspondingly, for an accessed standard web page, the device would display the standard web page in a landscape orientation or launch a landscape-oriented browser.

Embodiments disclosed herein address the above stated needs by displaying the accessed web page in the appropriate orientation on the handheld wireless communication device without intervention by the user.

DETAILED DESCRIPTION

Figure 1:
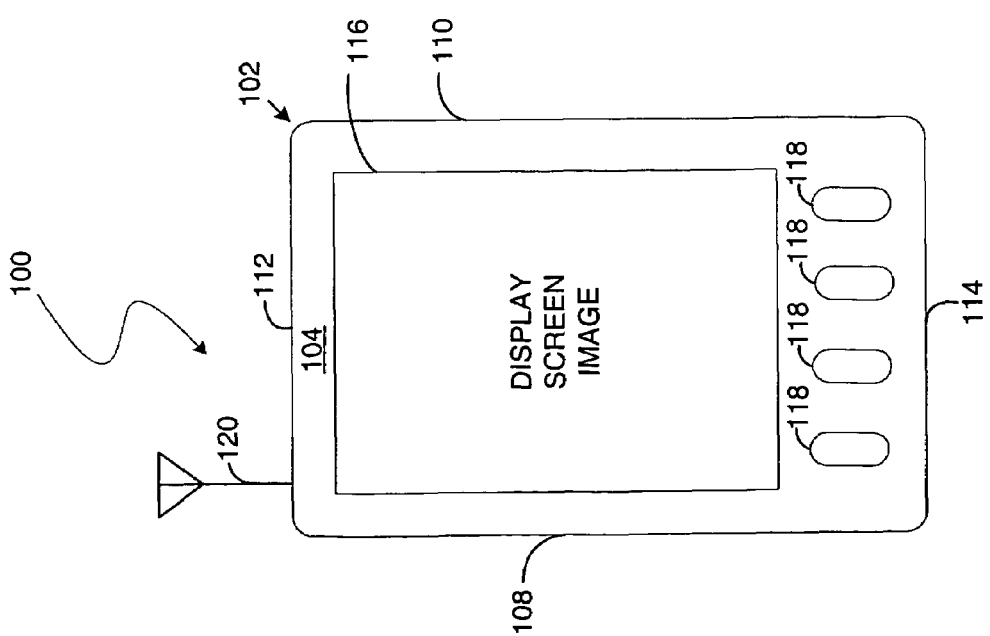
FIG. 1 illustrates a handheld wireless communication device with a display screen in a portrait orientation.

FIG. 1 illustrates a handheld wireless communication device 100 with the display screen in a portrait orientation.

The handheld wireless communication devices can be one of many conventionally known, for example, Palm VII™ brand personal digital assistant (PDA) by Palm operating AvantGo portrait-only oriented browser, Pocket IE portrait- and landscape-oriented browser, or ThunderHawk landscape-only oriented browser, or a combination thereof. Other Internet-enable wireless communication devices could also be used, for example, handheld computers and cellular telephones.

The handheld wireless communication device 100 can include an elongated rectangular housing 102 in which the electronic circuitry (not shown) of the device is operatively disposed. Housing 102 has a front wall 104, a left side wall 108, a right side wall 110, a top end wall 112, and a bottom end wall 114.

A display screen 116 is operatively mounted on the front wall 104 and, as viewed in FIG. 1, has a vertically elongated rectangular configuration. Also mounted on the front housing side wall 104, directly beneath the bottom end of the display screen 116, are four horizontally spaced apart, vertically elongated user input buttons 118. An antenna 120 is mounted on the housing 102 to transmit and receive wireless signals between the wireless communication device and a web site providing web page content.

The handheld wireless communication device 100 can be operated in one of two different display screen orientations—a "portrait" orientation (FIG. 1) in which the length of the display screen 116 is vertically oriented, and a "landscape" orientation (FIG. 2) in which the length of the display screen is horizontally oriented and rotated ninety degrees in a counterclockwise direction from its FIG. 1 portrait orientation. It should be understood by one skilled in the art that an alternative embodiment envisions a handheld wireless communication device 100 which is designed to be operated in one of four different display screen orientations: a) a first orientation which is the "portrait" orientation shown in FIG. 1, and b) three subsequent orientations which are all rotated ninety degrees from a prior orientation, in a counterclockwise direction from the FIG. 1 portrait orientation.

With the wireless communication device 100 in its FIG. 1 portrait orientation, when the user selects a particular web page, the browser generates on the display screen 116 a display screen image that may comprise text or graphics or both. With the wireless communication device in its FIG. 1 portrait orientation, the display screen text and graphics can be presented to the user in what may be termed a normal "upright" orientation, i.e., so that displayed text reads from left to right across the screen. In this orientation, a portrait-oriented browser, or portrait- and landscape-oriented browser, can be used to display the web page.

Figure 2:
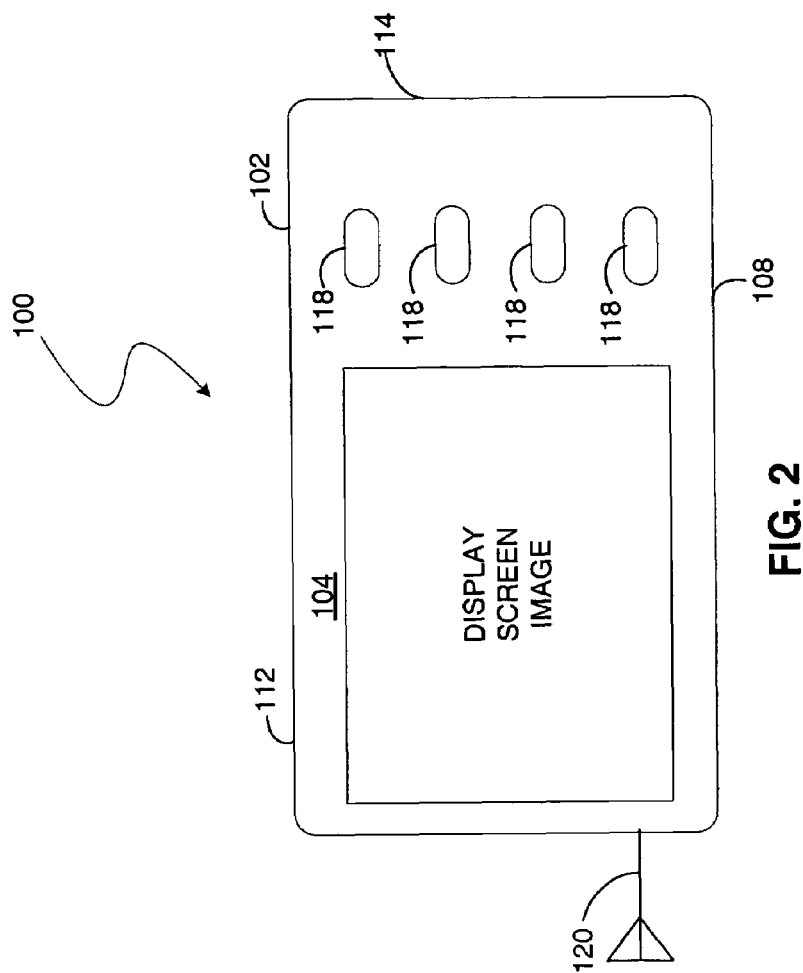
FIG. 2 illustrates the handheld wireless communication device of FIG. 1 with the display screen in a landscape orientation.

As shown in FIG. 2, the wireless communication device 100 can also be held and used in its landscape orientation by rotating the wireless communication device ninety degrees in a counterclockwise direction from its FIG. 1 portrait orientation. When the user selects a particular web page, the browser generates on the display screen 116 a display screen image that can comprise text or graphics or both, in the normal "upright" orientation. In this orientation, a landscape-oriented browser, or portrait- and landscape-oriented browser, can be used to display the web page.

Conventional hardware representatively utilized in the wireless communication device 100 can include a central processing unit (CPU) electrically connected to memory, video controller, and a wireless modem via a local bus; and a bus interface electrically connected to a system bus. The system bus can comprise address, data, and control buses as are well known in the art, and provides communication between the CPU and input/output (I/O) devices such as personal computer memory card interface association (PCM-CIA) cards, a fax modem, a hard disk, and other I/O devices. The antenna can be coupled to the wireless modem.

In operation, the CPU executes instructions stored in the memory, and communicates information to the video controller to display applicable programs and data on the display screen 116. The CPU has a plurality of I/O interrupt signal lines which are operatively connected to the control buttons 118 and touch-screen display screen 116 to allow the wireless communication device's user to input commands to the CPU. The signal lines can be used during execution of a display subroutine. These elements, their basic functionality, and their relationship to one another are known to one of ordinary skill in the art.

Figure 3:
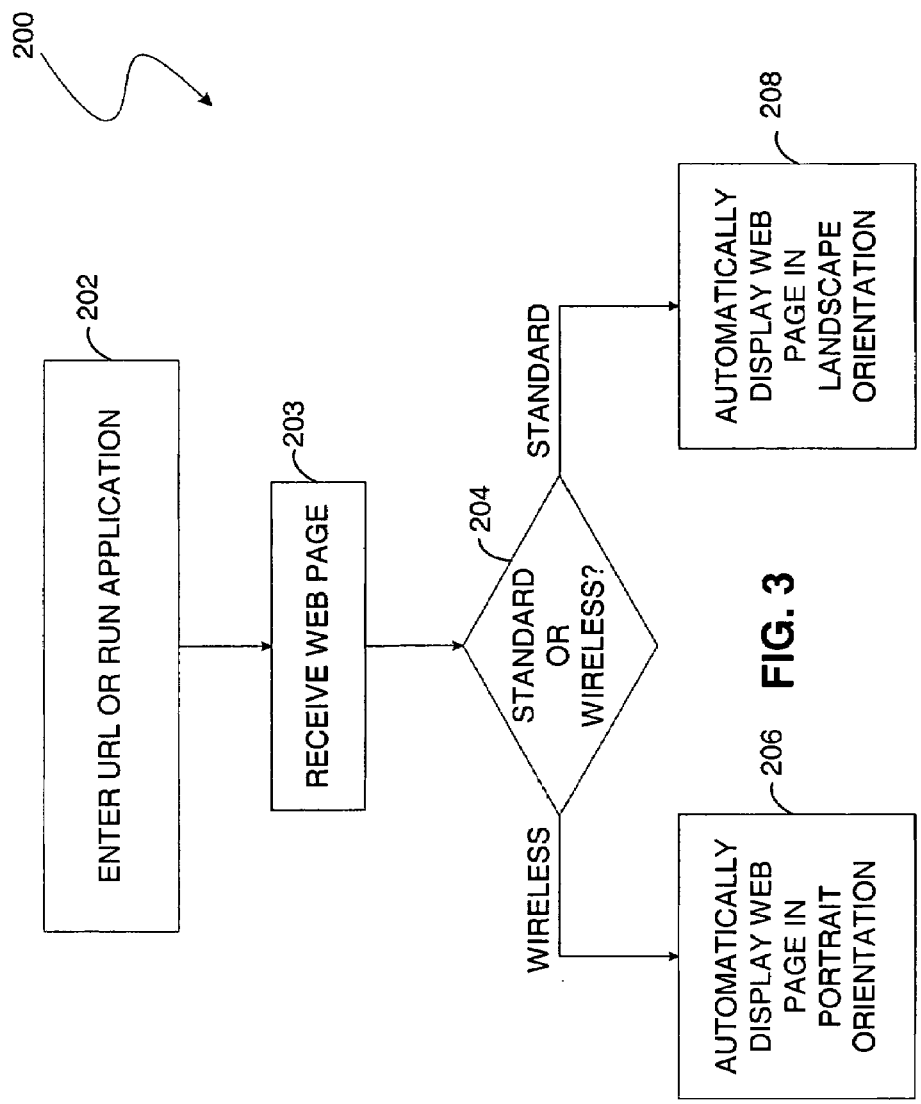
FIG. 3 illustrates a flow chart of a method carried out by the wireless communication device.

FIG. 3 illustrates a flow chart of a method 200 carried out by the wireless communication device 100. The method could also be carried out on a server, or a combination of the server and wireless communication device.

At block 202, a user can enter a uniform resource locator (URL) in the ADDRESS box of a web browser operating on the wireless communication device. By the user pressing SEND, the wireless communication device can wirelessly access and receive a web page on a remote server. (Block 203.) One of ordinary skill in the art will recognize other ways to access and receive a web page, for example, click on a hyperlink embedded in a web page displayed on the display screen, or running an application that automatically accesses a web site.

The web browser can be one or more of the previously described commercially available browsers.

After the web page is received, at block 204 the wireless communication device can determine whether the received web page is formatted for display on the display screen 116 or for display on monitor of a desktop or laptop computer. When the accessed web page is not formatted for display on the wireless communication device's display screen, that is, the web page is a standard web page, the wireless communication device can automatically display the accessed web page in landscape orientation 208 on the display screen. The landscape orientation can be achieved by having the portrait-oriented browser rotate an image represented by the received web page ninety degrees, or by launching a landscape-oriented browser that can display the accessed web page in landscape orientation. Typically, the accessed web page is stored in the memory upon receipt and one of ordinary skill in the art will appreciate that the stored web page can be manipulated to achieve the desired viewing orientation.

In some instances, better landscape viewing may be achieved by running applications that change the font size and change the image size without changing content of the web page. Conventional techniques may be employed for these purposes.

Conversely, when the received web page is formatted for display on the display screen, that is, the web page is a wireless web page, the web page can be automatically displayed in portrait orientation 206 on the display screen when the received web page is formatted for display on the display screen. The landscape orientation can be achieved by having the portrait-oriented browser display the web page or by launching a portrait-oriented browser if one were not operating.

There are several ways to determine whether a received web page is a standard web page or a wireless web page that will be appreciated by one of ordinary skill in the art. For example, the web page can be a Hypertext Markup Language (HTML) document that uses markup tags to mark the elements of a file. An element is a fundamental component of the structure of a text document, for example, heads, titles, headings, paragraphs, tables, text, and lists. Some elements can contain an attribute, which is additional information that is included in the tag. This and other additional information may be alignment, start of a new paragraph, font, maximum number of characters for a line, forced line break, character formatting, color, size of images being downloaded with text alignment of images, alternate text for images, and the like.

From the elements, attributes, and other content of the HTML document, the wireless communication device can determine whether the received web page is suitable for display on a monitor of a laptop or desktop computer or for display on a display screen of a handheld wireless communication device. For example, if an attribute representing width of the page significantly exceeded the width of the display screen in the vertical orientation, then the web page can be deemed a standard web page and be best displayed in the landscape orientation.

One of ordinary skill in the art will appreciate that the above principles for determining image orientation can also be applied to other languages for producing web page documents, for example, Extensible Markup Language (XML), Handheld Device Markup Language (HDML), and Wireless Markup Language (WML).

Also, the image represented by the received web page can be built in memory before displaying. Before posting the image to the display screen, the wireless communication device can determine the amount of scrolling that would be required in the vertical direction or the horizontal direction, or both, to view the entire image in both the portrait-oriented browser and the landscape-oriented browser. The browser having the less scrolling would be the browser to display the received web page in the corresponding orientation of the browser. Further, a header could be placed in the web page that identifies the web page as a standard web page or a wireless web page.

The above-described embodiment assumed that the vertical orientation of the display screen is the standard orientation of a wireless communication device and that the landscape orientation is the standard orientation for a web page. One of ordinary skill in the art will appreciate that a horizontal orientation may be a standard orientation on certain wireless communication devices and that a vertical orientation may be a standard orientation for web pages. One of ordinary skill in the art can easily apply the above principles to the latter situation.

In summary, the wireless communication device can display an accessed web page in the appropriate orientation on the handheld wireless communication device without intervention by the user.

What is claimed is:

1. A method of displaying a web page on a wireless communication device, the method comprising:
   receiving the web page at the wireless communication device;
   determining at the wireless communication device whether the received web page is formatted for a portrait orientation on a display screen of the wireless communication device, wherein the determination is made by determining if a width of the received web page is greater than a width of the display screen of the wireless communication device, wherein the received web page is not formatted for the portrait orientation if the width of the received web page is greater than the display screen of the wireless communication device; and
   when the received web page is not formatted for the portrait orientation on the display screen, automatically displaying without user intervention the received web page in a landscape orientation on the display screen,
   wherein the wireless communication device includes a portrait-oriented browser and a landscape-oriented browser such that the displaying further comprises automatically rotating an image corresponding to the received web page by approximately ninety degrees for automatic display in either the portrait orientation or the landscape orientation on the wireless communication device.

2. The method of claim 1 further comprising:
   launching the landscape-oriented browser that can display the received web page.

3. The method of claim 1 further comprising:
   launching the portrait-oriented browser that can display the received web page.

4. The method of claim 1 further comprising:
   when the received web page is formatted for portrait orientation on the display screen, automatically displaying the received web page in portrait orientation on the display screen.

5. The method of claim 1 further comprising:
   when the received web page is formatted for landscape orientation on the display screen, automatically displaying the received web page in landscape orientation on the display screen.

6. The method of claim 1, wherein determining whether the received web page is formatted for the portrait orientation on the display screen of the wireless communication device comprises:
   examining the contents of the received web page.

7. The method of claim 1, wherein determining whether the received web page is formatted for the portrait orientation on the display screen of the wireless communication device comprises:
   building an image represented by the received web page in memory; and
   determining the amount of scrolling to view the image in both the portrait-oriented browser and the landscape-oriented browser;
   wherein the received web page is not formatted for the portrait orientation on the display screen when the amount of scrolling for the portrait-oriented browser is greater than the amount of scrolling for the landscape-oriented browser.

8. The method of claim 1, further comprising determining whether the received web page is formatted for landscape orientation on the display screen of the wireless communication device comprising:
   building an image represented by the received web page in memory; and
   determining the amount of scrolling to view the image in both the portrait-oriented browser and the landscape-oriented browser;
   wherein the received web page is not formatted for the landscape orientation on the display screen when the amount of scrolling for the landscape-oriented browser is greater than the amount of scrolling for the portrait-oriented browser.

9. The method of claim 1, wherein determining whether the received web page is formatted for display on a display screen of the wireless communication device comprises:
   reading a header in the received web page that identifies the received web page as a standard web page or a wireless web page.

10. The method of claim 1, wherein the wireless communication device is a personal digital assistant.

11. A wireless communication device for displaying a web page, the wireless communication device comprising:
    an antenna configured to wirelessly receive the web page;
    a processor, in communication with the antenna, configured to determine whether the received web page is formatted for a portrait orientation, wherein the determination is made by determining if a width of the received web page is greater than a width of a display screen of a wireless communication device, wherein the received web page is not formatted for the portrait orientation if the width of the received web page is greater than the display screen of the wireless communication device;

the display screen, in communication with the processor, configured to automatically display without user intervention the received web page in a landscape orientation on the display screen when the received web page is not formatted for the portrait orientation on the display screen; and a portrait-oriented browser and a landscape-oriented browser, in communication with the processor and the display screen, configured to automatically rotate an image corresponding to the received web page by approximately ninety degrees for automatic display in either the portrait orientation or the landscape orientation on the wireless communication device.

12. The wireless communication device of claim 11, the processor is further configured to launch the landscape-oriented browser that can display the received web page.

13. The wireless communication device of claim 11, the processor is further configured to launch the portrait-oriented browser that can display the received web page.

14. The wireless communication device of claim 11, the display screen is further configured to automatically display the received web page in portrait orientation on the display screen when the received web page is formatted for portrait orientation.

15. The wireless communication device of claim 11, the display screen is further configured to automatically display the received web page in landscape orientation on the display screen when the received web page is formatted for landscape orientation.

16. The wireless communication device of claim 11, the processor is further configured to examine the contents of the received web page to determine whether the received web page is formatted for the portrait orientation.

17. The wireless communication device of claim 11, further comprising:
a memory;
wherein the processor is further configured to determine whether the received web page is formatted for the portrait orientation on the display screen of the wireless communication device by:
building an image represented by the received web page in memory; and
determining the amount of scrolling to view the image in both the portrait-oriented browser and the landscape-oriented browser;
wherein the received web page is not formatted for the portrait orientation on the display screen when the amount of scrolling for the portrait-oriented browser is greater than the amount of scrolling for the landscape-oriented browser.

18. The wireless communication device of claim 11, further comprising:
a memory;
wherein the processor is further configured to determine whether the received web page is formatted for the landscape orientation on the display screen of the wireless communication device by:
building an image represented by the received web page in memory; and
determining the amount of scrolling to view the image in both the portrait-oriented browser and the landscape-oriented browser;
wherein the received web page is not formatted for the landscape orientation on the display screen when the amount of scrolling for the landscape-oriented browser is greater than the amount of scrolling for the portrait-oriented browser.

19. The wireless communication device of claim 11, the processor determines whether the received web page is formatted for display on the display screen of the wireless communication device by:
reading a header in the web page that identifies the web page as a standard web page or a wireless web page.

20. A wireless communication device for displaying a web page, the device comprising:
means for receiving the web page;
means for determining whether the received web page is formatted for a portrait orientation on a means for displaying on the wireless communication device, wherein the determination is made by determining if a width of the received web page is greater than a width of the means for displaying, wherein the received web page is not formatted for the portrait orientation if the width of the received web page is greater than the means for displaying; and
means for automatically displaying without user intervention the received web page in a landscape orientation on the means for displaying when the received web page is not formatted for the portrait orientation on the means for displaying,
wherein the wireless communication device includes means for browsing in the portrait orientation and means for browsing in the landscape orientation such that the means for displaying further comprises means for automatically rotating an image corresponding to the received web page by approximately ninety degrees for automatic display in either the portrait orientation or the landscape orientation on the wireless communication device.

21. The wireless communication device of claim 20 further comprising:
means for launching a landscape-oriented browser that can display the received web page.

22. The wireless communication device of claim 20 further comprising:
means for launching a portrait-oriented browser that can display the received web page.

23. The wireless communication device of claim 20 further comprising:
means for automatically displaying the received web page in portrait orientation on the means for displaying when the received web page is formatted for portrait orientation on the means for displaying.

24. The wireless communication device of claim 20 further comprising:
means for automatically displaying the received web page in landscape orientation on the means for displaying when the received web page is formatted for landscape orientation on the means for displaying.

25. The wireless communication device of claim 20, wherein means for determining whether the received web page is formatted for the portrait orientation on the means for displaying on the wireless communication device comprises:
means for examining the contents of the received web page.

26. The wireless communication device of claim 20, wherein the means for determining whether the received web page is formatted for the portrait orientation on the means for displaying on the wireless communication device comprises:

means for building an image represented by the received web page in memory; and means for determining the amount of scrolling to view the image in both a portrait-oriented browser and a landscape-oriented browser;

wherein the received web page is not formatted for the portrait orientation on the means for displaying when the amount of scrolling for the portrait-oriented browser is greater than the amount of scrolling for the landscape-oriented browser.

27. The wireless communication device of claim 20, wherein the means for determining whether the received web page is formatted for the landscape orientation on the means for displaying on the wireless communication device comprises:

means for building an image represented by the received web page in memory; and means for determining the amount of scrolling to view the image in both a portrait-oriented browser and a landscape-oriented browser;

wherein the received web page is not formatted for the landscape orientation on the means for displaying when the amount of scrolling for the landscape-oriented browser is greater than the amount of scrolling for the portrait-oriented browser.

28. The wireless communication device of claim 20, wherein means for determining whether the received web page is formatted for display on the means for displaying on the wireless communication device comprises:

means for reading a header in the web page that identifies the web page as a standard web page or a wireless web page.

29. A memory medium comprising instructions, which, when executed by a machine, cause the machine to perform operations, the instructions comprising:

at least one instruction for receiving the web page at a wireless communication device;

at least one instruction for determining at the wireless communication device whether the received web page is formatted for a portrait orientation on a display screen of the wireless communication device, wherein the determination is made by determining if a width of the received web page is greater than a width of the display screen of the wireless communication device, wherein the received web page is not formatted for the portrait orientation if the width of the received web page is greater than the display screen of the wireless communication device; and when the received web page is not formatted for the portrait orientation on the display screen, at least one instruction for automatically displaying without user intervention the received web page in a landscape orientation on the display screen, wherein the wireless communication device includes a portrait-oriented browser and a landscape-oriented browser such that the at least one instruction for displaying further comprises at least one instruction for automatically rotating an image corresponding to the received web page by approximately ninety degrees for automatic display in either the portrait orientation or the landscape orientation on the wireless communication device.

30. The memory medium of claim 29, further comprising:

at least one instruction to launch the landscape-oriented browser that can display the received web page and/or at least one instruction to launch the portrait-oriented browser that can display the received web page.

31. The memory medium of claim 29, further comprising:

at least one instruction to automatically display the received web page in portrait orientation on the display screen, when the received web page is formatted for portrait orientation on the display screen.

32. The memory medium of claim 29, further comprising:

at least one instruction to automatically display the received web page in landscape orientation on the display screen, when the received web page is formatted for landscape orientation on the display screen.

33. The memory medium of claim 29, wherein the at least one instruction for determining whether the received web page is formatted for the portrait orientation on the display screen of the wireless communication device further comprises:

at least one instruction to examine the contents of the received web page.

34. The memory medium of claim 29, wherein the at least one instruction for determining whether the received web page is formatted for the pox-trait orientation on the display screen of the wireless communication device further comprises:

at least one instruction to build an image represented by the received web page in memory; and at least one instruction to determine the amount of scrolling to view the image in both the portrait-oriented browser and the landscape-oriented browser;

wherein the received web page is not formatted for the portrait orientation on the display screen when the amount of scrolling for the portrait-oriented browser is greater than the amount of scrolling for the landscape-oriented browser.

35. The memory medium of claim 29, further comprising at least one instruction for determining whether the received web page is formatted for landscape orientation on the display screen of the wireless communication device comprising:

at least one instruction to build an image represented by the received web page in memory; and at least one instruction to determine the amount of scrolling to view the image in both the portrait-oriented browser and the landscape-oriented browser;

wherein the received web page is not formatted for the landscape orientation on the display screen when the amount of scrolling for the landscape-oriented browser is greater than the amount of scrolling for the portrait-oriented browser.

36. The memory medium of claim 29, wherein the at least one instruction for determining whether the received web page is formatted for display on the display screen of the wireless communication device comprises:

at least one instruction to read a header in the web page that identifies the web page as a standard web page or a wireless web page.

* * * * *

UNITED STATES PATENT AND TRADEMARK OFFICE
CERTIFICATE OF CORRECTION

| | |
|---|---|
| PATENT NO. | : 7,627,354 B2 |
| APPLICATION NO. | : 10/232565 |
| DATED | : December 1, 2009 |
| INVENTOR(S) | : Khazaka et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 368 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,627,354 B2
APPLICATION NO. : 10/232565
DATED : December 1, 2009
INVENTOR(S) : Khazaka et al.

It is certified that error appears in the above-identified patent and that said Letters Patent is hereby corrected as shown below:

Column 9, line 36, claim 29: "the web page" to read as --a web page--

Column 10, line 25, claim 34: "pox-trait" to read as --portrait--

Signed and Sealed this
Twenty-fourth Day of May, 2011

David J. Kappos
*Director of the United States Patent and Trademark Office*